(12) United States Patent
Aklilu et al.

(10) Patent No.: US 7,996,339 B2
(45) Date of Patent: Aug. 9, 2011

(54) METHOD AND SYSTEM FOR GENERATING OBJECT CLASSIFICATION MODELS

(75) Inventors: Ameha Aklilu, Chapel Hill, NC (US); Raed Hijer, Raleigh, NC (US); Wilson Velez, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1410 days.

(21) Appl. No.: 10/943,343

(22) Filed: Sep. 17, 2004

(65) Prior Publication Data

US 2006/0074829 A1    Apr. 6, 2006

(51) Int. Cl.
*G06N 5/00* (2006.01)
(52) U.S. Cl. ............................................ 706/12; 706/45
(58) Field of Classification Search .................... 706/12, 706/45; 714/718; 382/125; 600/544; 342/450
See application file for complete search history.

(56) References Cited

U.S. PATENT DOCUMENTS

| | | | |
|---|---|---|---|
| 5,659,626 A * | 8/1997 | Ort et al. ........................ | 382/125 |
| 5,946,674 A | 8/1999 | Nordin et al. | |
| 6,182,058 B1 | 1/2001 | Kohavi | |
| 6,249,252 B1 * | 6/2001 | Dupray ......................... | 342/450 |
| 6,449,603 B1 | 9/2002 | Hunter | |
| 6,456,993 B1 | 9/2002 | Freund | |
| 6,507,843 B1 | 1/2003 | Dong et al. | |
| 6,513,025 B1 | 1/2003 | Rosen | |
| 6,532,305 B1 | 3/2003 | Hammen | |
| 6,658,287 B1 * | 12/2003 | Litt et al. ....................... | 600/544 |
| 6,851,076 B1 * | 2/2005 | Cook et al. .................... | 714/718 |
| 6,892,189 B2 * | 5/2005 | Quass et al. ................... | 706/12 |
| 2002/0165839 A1 | 11/2002 | Taylor et al. | |
| 2003/0018595 A1 | 1/2003 | Chen et al. | |
| 2004/0002930 A1 | 1/2004 | Oliver et al. | |
| 2004/0024769 A1 | 2/2004 | Forman et al. | |

* cited by examiner

*Primary Examiner* — Wilbert L Starks, Jr.
(74) *Attorney, Agent, or Firm* — Winstead, P.C.

(57) ABSTRACT

A method for generating object classification models is disclosed. Initially, a set of training data is fed into a training algorithm to generate a first object classification model. A set of field data is then applied to the first object classification model to produce a set of field object classifications. The number of data in the set of field data is significantly less than the number of data in the set of training data. Finally, the set of field object classifications and the set of field data are fed into the training algorithm to generate a second object classification model. The second object classification model can be utilized for predicting object classifications.

2 Claims, 4 Drawing Sheets

| RULE IDENTIFIER | RULE CONDITION | BIAS |
| --- | --- | --- |
| RULE 1 | IF HUMIDITY > 30 & TEMP > 35 | PLAY |
| RULE 2 | IF PRESSURE < 1 & TEMP < 10 | NO PLAY |
| ⋮ | ⋮ | |
| RULE N | ⋮ | |

*Figure 3*

METHOD AND SYSTEM FOR GENERATING OBJECT CLASSIFICATION MODELS

BACKGROUND OF THE INVENTION

1. Technical Field

The present invention relates to data mining in general, and, in particular, to a method and system for providing machine learning. Still more particularly, the present invention relates to a method and system for generating object classification models.

2. Description of Related Art

The objective of object classification (often referred to as supervised learning) is to find an approximation (or hypothesis) to a target concept that assigns objects (such as processes or events) into different classifications (or classes). Generally speaking, object classification can be divided into two phases, namely, a learning phase and a testing phase.

The goal of a learning phase is to learn how to classify objects by finding correlations among object descriptions. During the learning phase, a learning algorithm is applied to a set of training data that typically includes object descriptions (feature variables) together with the correct classification for each object (class variable) for constructing an object classification model capable of predicting a class variable of a record in which the feature variables are known but the class variable is unknown. Thus, the end result of the learning phase is an object classification model that can be used to predict classes of new objects.

During the testing phase, the object classification model derived in the training phase is utilized to predict the classes of a set of testing objects. The object classes predicted by the object classification model are subsequently compared to the true object classes to determine the accuracy of the object classification model.

While most learning algorithms of conventional object classification systems can produce sufficiently accurate object classification models for many applications, they suffer from a number of limitations. Specifically, the learning algorithms of conventional object classification systems are unable to adapt over time. In other words, once an object classification model had been generated by a learning algorithm, the object classification model cannot be reconfigured based on new experiences. Thus, conventional object classification systems that employ such object classification models are prone to repeating the same errors.

Consequently, it would be desirable to provide an improved object classification system.

SUMMARY OF THE INVENTION

In accordance with a preferred embodiment of the present invention, a set of training data is fed into a training algorithm to generate a first object classification model. A set of field data is then applied to the first object classification model to produce a set of field object classifications. The number of data in the set of field data is significantly less than the number of data in the set of training data. Finally, the set of field object classifications and the set of field data are fed into the training algorithm to generate a second object classification model. The second object classification model can be utilized for predicting object classifications.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a rule table within the object classification system from FIG. 1, in accordance with a preferred embodiment of the present invention.

DETAILED DESCRIPTION OF A PREFERRED EMBODIMENT

Figure 1:
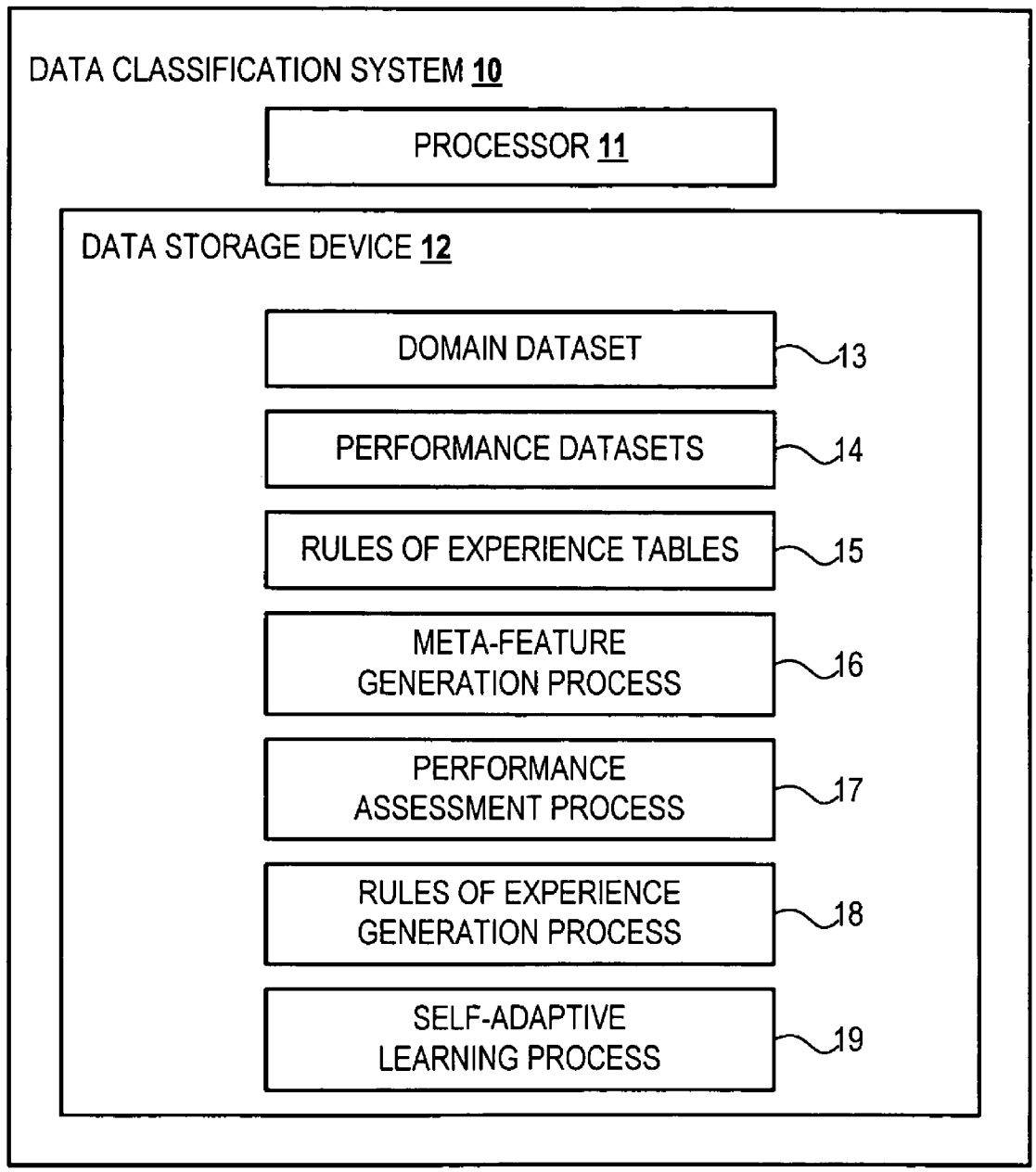
FIG. 1 is a block diagram of an object classification system, in accordance with a preferred embodiment of the present invention.

Referring now to the drawings and in particular to FIG. 1, there is depicted a block diagram of an object classification system, in accordance with a preferred embodiment of the present invention. As shown, an object classification system 10 includes a processor 11 and a data storage device 12. Data storage device 12 stores instructions for processor 11 to retrieve, interpret and execute.

Data storage device 12 preferably includes a domain dataset 13, performance datasets 14 and rules of experience tables 15. Domain dataset 13 contains a record for each object and its associated class. Performance datasets 14 contain a learning algorithm that can generate an object classification model for a domain. Rules of experience tables 15 identify a number of prioritized rules and their corresponding conditions, which if satisfied, provide a bias (or outcome) that should be employed during the generation of an object classification model.

In addition, data storage device 12 includes a meta-feature generation process 16, a performance assessment process 17, a rules of experience generation process 18 and a self-adaptive learning process 19. Meta-feature generation process 16 processes each domain dataset to represent the domain as a set of meta-features. Performance assessment process 17 evaluates the performance of a given object classification model for a given domain dataset described by a set of meta-features, and then stores the results in performance datasets 14. Rules of experience generation process 18 evaluates performance datasets 14 in order to modify or extend the rules currently stored within rules of experience tables 15. Self-adaptive learning process 19 identifies the best object classification model for a given domain dataset 13 according to the rules currently stored within rules of experience tables 15.

Figure 2:
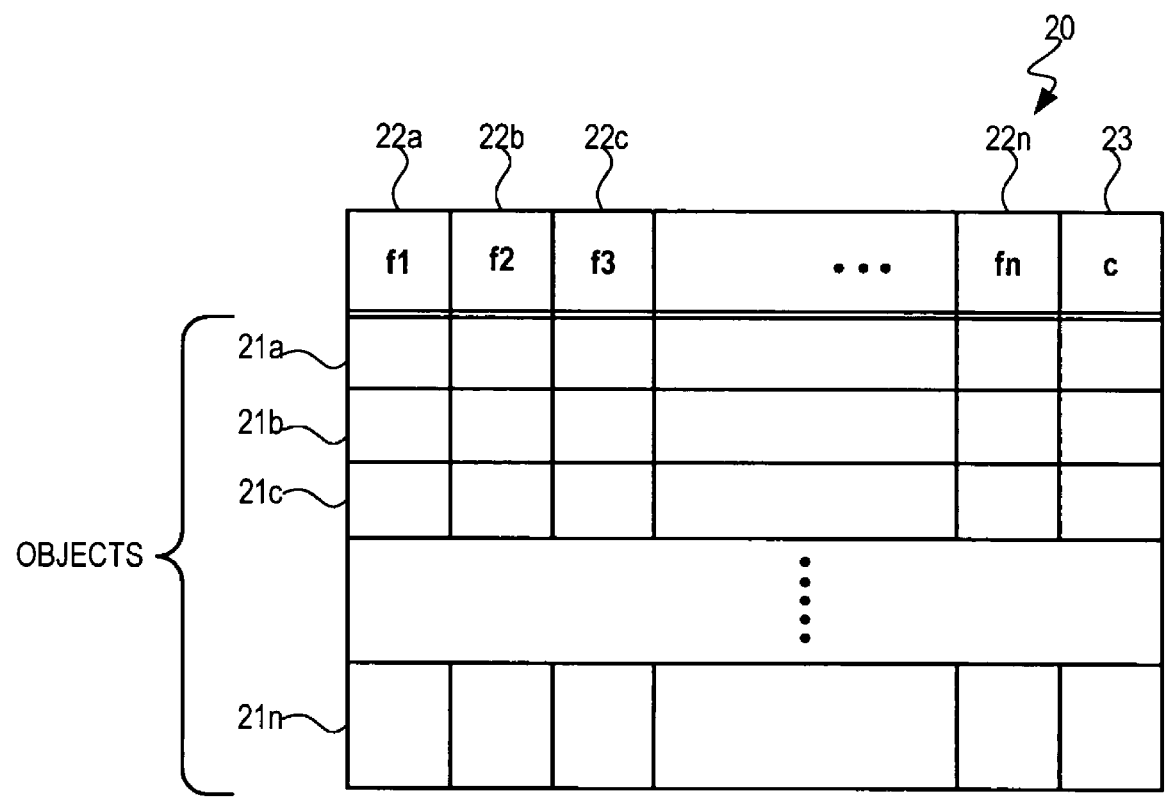
FIG. 2 is an object table within the object classification system from FIG. 1, in accordance with a preferred embodiment of the present invention.

With reference now to FIG. 2, there is depicted an object table within domain dataset 13 (from FIG. 1), in accordance with a preferred embodiment of the present invention. As shown, an object table 20 maintains multiple records, such as records 21a-21n, each associated with a different object. Each of records 21a-21n contains multiple feature fields, such as feature fields 22a-22n, for describing various features of the associated object. Each of records 21a-21n also contains a class field, such as a class field 23, for describing the class of the associated object.

Referring now to FIG. 3, there is illustrated a rule table within rules of experience tables 15 (from FIG. 1), in accordance with a preferred embodiment of the present invention. As shown, a rule table 30 includes multiple rules, such as rules 31a-31n. Each of rules 31a-31n is identified by a rule number stored in a rule identifier field 32. Each of rules 31a-31n is associated with a condition stored in a rule condition field 33. In addition, each of rules 31a-31n is associated with a bias (or outcome) stored in a bias field 34. When one of rules 31a-31n within rule table 30 is satisfied, the corresponding bias stored within bias field 34 will be employed during the generation of an object classification model.

For example, two rules are included in rule table 30. If the rule of humidity being greater than 30 and the temperature being greater than 35 is satisfied, then the bias is play. But if the rule of pressure being less than 1 and the temperature being less than 10 is satisfied, then the bias is no play. During the generation of an object classification model, the above-mentioned two rules along with their respective bias will be included in the object classification model.

Figure 4:
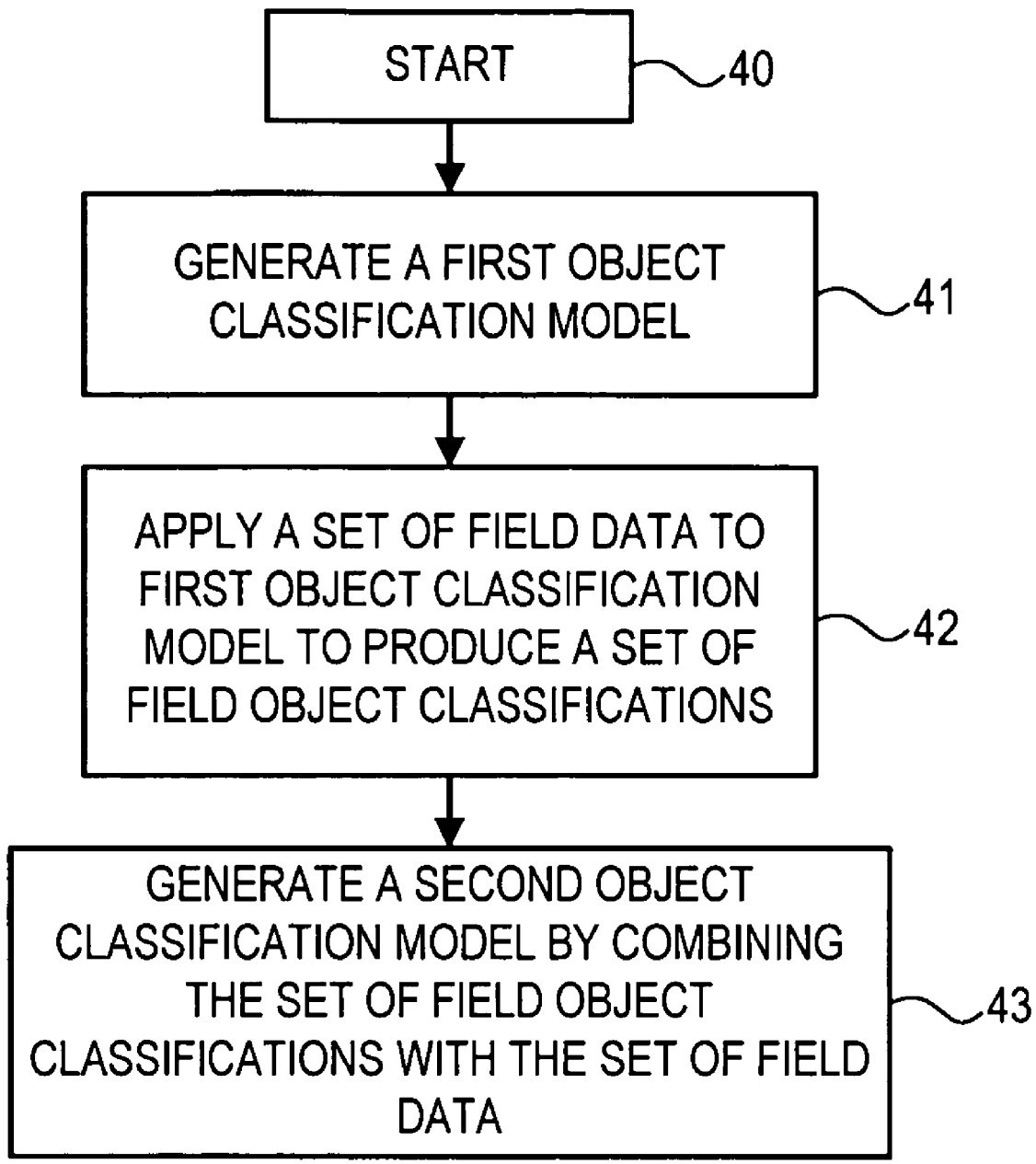
FIG. 4 is a high-level logic flow diagram of a method for generating an object classification model, in accordance with a preferred embodiment of the present invention.

With reference now to FIG. 4, there is depicted a high-level logic flow diagram of a method for generating an object classification model, in accordance with a preferred embodiment of the present invention. Starting at block 40, a set of training data is fed into a training algorithm to generate a first object classification model, as shown in block 41. The set of training data include various objects and their respective object classifications. A set of field data is then applied to the first object classification model to produce a set of field object classifications, as depicted in block 42. The set of field data also include various objects and their respective object classifications that are similar to those within the set of training data. However, the number of records in the set of field data is significantly less than the number of records in the set of training data.

Subsequently, the set of field object classifications is combined with the set of field data to be fed into the training algorithm again to generate a second object classification model, as shown in block 43. The second object classification model can be utilized for predicting object classifications. The prediction accuracy of the second object classification model should be better than the prediction accuracy of the first object classification model.

As has been described, the present invention provides an improved method and system for generating object classification models. By taking advantage of the similarities between tasks, not only the learning of each task becomes easier, but the entire learning process often performs better than each task is being taken alone.

Taking the task of learning to program as an example, if three different persons with no previous knowledge of programming are assigned the task of learning three different programming languages, they will all be faced with the task of learning the basics of programming as well as learning the nuances of a specific programming language. However, if one person is told to learn all three languages, that person will only have to learn the basics of programming once, and then that person can proceed to learn the particulars of each programming language. Concepts learned from one programming language may enhance the learning of concepts for another programming language, inspiring ideas that may not have taken shape at all if each programming language is taken separately.

Although the present invention has been described in the context. of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. An object classification system comprising:
a memory unit for storing a computer program for generating object classification models; and
a processor coupled to said memory unit, wherein said processor, responsive to said computer program, comprises:
circuitry for generating a first object classification model by feeding a set of training data related to an object class to be predicted into a training algorithm, wherein said set of training data includes a plurality of objects along with their respective classifications;
circuitry for applying a set of field data related to said object class to be predicted to said first object classification model to produce a set of field object classifications, wherein said set of field data also includes a plurality of objects along with their respective classifications;
circuitry for generating a second object classification model by feeding said set of field data and said set of field object classifications into said training algorithm again; and
circuitry for storing said second object classification model, wherein said second object classification is to be utilized to predict object classifications with a higher prediction accuracy than said first object classification model.

2. The object classification system of claim 1, wherein a number of records in said set of field data is substantially less than a number of records in said set of training data.

* * * * *